T. J. HOLTON.
Sewing-Machine Shuttles.
No. 196,018. Patented Oct. 9, 1877.
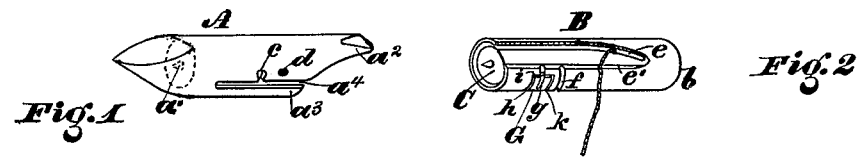
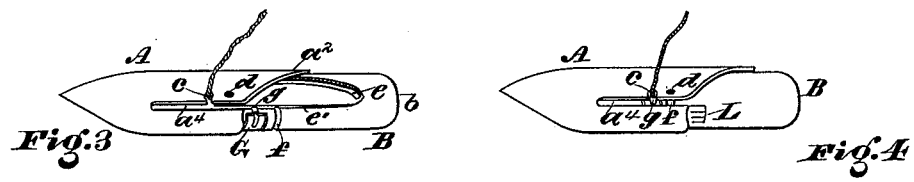
 
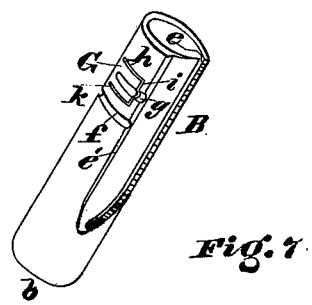

UNITED STATES PATENT OFFICE.

THOMAS J. HOLTON, OF PHILADELPHIA, PENNSYLVANIA.

IMPROVEMENT IN SEWING-MACHINE SHUTTLES.

Specification forming part of Letters Patent No. 196,018, dated October 9, 1877; application filed July 13, 1877.

*To all whom it may concern:*

Be it known that I, THOS. J. HOLTON, of Philadelphia, in the county of Philadelphia and State of Pennsylvania, have invented certain new and useful Improvements in Sewing-Machine Shuttles; and I do hereby declare the following to be a full, clear, and exact description of the invention, such as will enable others skilled in the art to which it pertains to make and use it, reference being had to the accompanying drawings, which form part of this specification, in which—

Figures 1, 2, and 7 are perspective details. Figs. 3 and 4 are perspectives of my invention, showing, respectively, the sections of the shuttle partly and wholly closed; Figs. 5 and 6, transverse vertical sections.

My invention has for its object to provide a shuttle which can be threaded with little or no difficulty, and the tension of which may be adjusted without the manipulation of screws, disks, or other devices requiring the use of a tool to effect their movement.

My improvements consist in forming a sewing-machine shuttle of two cylinders which telescope together, one sliding into the other, and the thread from the bobbin within passing between them to obtain the required tension.

My improvements still further consist in the peculiar details of construction hereinafter fully set forth.

Referring to the accompanying drawing, A and B represent two cylinders, having each a closed and an open end, the closed end of the cylinder A being or terminating in a point, while the closed end of the cylinder B is a blunt or rounded head, $b$. Each of the cylinders has a center hole, (shown at $a^1$ and $b'$, respectively,) forming bearings for the bobbin C, which is of the common or any suitable construction. The open end of the cylinder B is perfectly annular, so that its wall is of the same depth or length all around, while the open end of the cylinder A is beveled, so as to cause one side, $a^2$, of said cylinder to be longer than the opposite side $a^3$.

The cylinder A has a longitudinal slot, $a^4$, leading into which is a transverse notch or thread-groove, $c$. Said cylinder is also provided or formed with a pin or stud, $d$, which extends inwardly, as shown.

The cylinder B has a longitudinal curved slot, $e$, the metal of the cylinder on one side of the same being diminished in thickness, so as to form a shoulder, $e'$. An annular groove, $f$, in the cylinder B, affords a passage for the stud $d$.

G is a spring-tongue in the cylinder B, formed by sawing or cutting through the metal of the latter, as shown at $h$ $i$ $k$. $g$ is a short annular groove or thread-channel, beginning at the shoulder $e'$, and extending, as shown, into the tongue G.

The method of threading the shuttle is substantially as follows: The bobbin is placed in the cylinder B and the latter slid into the cylinder A, the shoulder $e'$ being in line with the slot $a^4$, and the free end of the bobbin-thread being passed or passing out through the slot $e$. When the open end of the cylinder B meets the closed end of the cylinder A, the pin or stud $d$ will be in line transversely with the groove $f$, which it will enter on rotating the two cylinders in opposite directions on their longitudinal axes, the cylinder B to the right and the cylinder A to the left, the bobbin-thread having been first drawn to enter the thread-guide or notch $c$.

The adjustment of the tension is accomplished by continuing the rotation of the cylinders in the direction already suggested, the extent of rotation required being indicated by a gage, (shown at L.)

What I claim as my invention is—

1. A sewing-machine shuttle composed of two cylinders, which telescope or slide one into the other, and are arranged, as described, to permit the inner cylinder to be revolved within the outer to adjust the tension of the bobbin-thread, substantially as set forth.

2. The cylinder A, having a pointed closed end, $a$, a beveled or inclined open end, a longitudinal slot, $a^4$, thread-guide $c$, and pin or stud $d$, substantially as shown and described.

3. The cylinder B, having slot $e$, shoulder $e'$, and annular grooves $f$ $g$, substantially as shown and described.

4. The shuttle-cylinder B, having spring-tongue G, formed by the kerfs or slits $h\ i\ k$, substantially as set forth.

5. The combination of cylinder A, having slot $a^4$, thread-guide $c$, and stud $d$, with the cylinder B, having slot $e$, shoulder $e'$, annular grooves $f\ g$, and spring-tongue G, the several parts being constructed and combined for operation substantially as shown and described.

In testimony that I claim the foregoing I have hereunto set my hand this 11th day of July, 1877.

THOS. J. HOLTON.

Witnesses:
    SAML. J. VAN STAVOREN,
    JNO. A. BELL.